US008560391B1

(12) United States Patent
Shaw et al.

(10) Patent No.: US 8,560,391 B1
(45) Date of Patent: Oct. 15, 2013

(54) CLASSIFICATION ENGINE FOR DYNAMIC E-ADVERTISEMENT CONTENT INSERTION (75) Inventors: Venson M. Shaw, Kirkland, WA (US); Coulter C. Henry, Jr., Marietta, GA (US); Linda Stanley Giles, Powder Springs, GA (US); Robert Z. Evora, Douglasville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1519 days.

(21) Appl. No.: 11/860,611

(22) Filed: Sep. 25, 2007

Related U.S. Application Data (63) Continuation-in-part of application No. 11/763,652, filed on Jun. 15, 2007.

(51) Int. Cl.
*G06Q 30/00* (2012.01)

(52) U.S. Cl.
USPC .................. 705/14.61; 705/14.66; 705/14.69; 725/32; 725/22

(58) Field of Classification Search
USPC ............. 380/227, 201; 705/59, 26, 14, 14.66, 705/14.69, 14.73, 14.56; 1/1; 707/999; 725/19, 22, 145, 39, 36, 32; 348/E7.036, E7.063; 715/738; 701/209; 382/100
See application file for complete search history.

(56) References Cited

U.S. PATENT DOCUMENTS

| 6,188,398 | B1 | 2/2001 | Collins-Rector et al. | |
|---|---|---|---|---|
| 6,311,185 | B1 | 10/2001 | Markowitz et al. | |
| 6,633,877 | B1 * | 10/2003 | Saigh et al. | 1/1 |
| 6,718,551 | B1 | 4/2004 | Swix et al. | |
| 7,188,186 | B1 | 3/2007 | Meyer et al. | |
| 7,373,599 | B2 | 5/2008 | McElfresh et al. | |
| 7,603,619 | B2 | 10/2009 | Baugher | |
| 7,853,969 | B2 * | 12/2010 | Smith et al. | 725/22 |
| 2002/0099731 | A1 | 7/2002 | Abajian | |
| 2002/0124254 | A1 | 9/2002 | Kikinis | |
| 2002/0196940 | A1 * | 12/2002 | Isaacson et al. | 380/227 |
| 2004/0025176 | A1 * | 2/2004 | Franklin et al. | 725/22 |
| 2005/0149968 | A1 * | 7/2005 | Konig et al. | 725/32 |
| 2005/0172312 | A1 * | 8/2005 | Lienhart et al. | 725/19 |
| 2007/0061245 | A1 | 3/2007 | Ramer et al. | |
| 2007/0061300 | A1 | 3/2007 | Ramer et al. | |
| 2007/0061301 | A1 | 3/2007 | Ramer et al. | |
| 2007/0061302 | A1 | 3/2007 | Ramer et al. | |
| 2007/0073717 | A1 | 3/2007 | Ramer et al. | |
| 2007/0073722 | A1 | 3/2007 | Ramer et al. | |
| 2007/0198364 | A1 * | 8/2007 | Quoc et al. | 705/26 |
| 2008/0195938 | A1 | 8/2008 | Tischer et al. | |
| 2008/0212937 | A1 * | 9/2008 | Son | 386/83 |
| 2009/0077580 | A1 | 3/2009 | Konig et al. | |
| 2010/0290667 | A1 * | 11/2010 | Lienhart et al. | 382/100 |

OTHER PUBLICATIONS

Nores, et al., "Non-Invasive and Personalized Advertising Through MPEG-4 Processing and Semantic Reasoning," Consumer Electronics, Jan. 10-14, 2007, 1-3.

* cited by examiner

*Primary Examiner* — Behrang Badii
(74) *Attorney, Agent, or Firm* — Woodcock Washburn LLP (57) ABSTRACT

A way to modify a media file to include an advertisement is described herein. A media includes, but is not limited to, broadcast television, video, or music. The content of the media is analyzed to determine an appropriate advertisement to be inserted into the media content. For example, the advertisement may be a pizza commercial inserted into media that is popular among college age individuals. The content of the media may be further analyzed to determine an appropriate position within the media to insert the advertisement. For example, the pizza commercial may be inserted after a scene in which the characters are eating. Another example may be the insertion of a dating service commercial in a movie immediately following a dating scene in the movie.

5 Claims, 7 Drawing Sheets

CLASSIFICATION ENGINE FOR DYNAMIC E-ADVERTISEMENT CONTENT INSERTION

CROSS-REFERENCE TO RELATED APPLICATIONS

This application is a continuation in part and claims priority to the subject matter disclosed in commonly assigned U.S. patent application Ser. No. 11/763,652 filed on Jun. 15, 2007, entitled "Classification Engine for Dynamic E-Advertisement Content Insertion."

BACKGROUND

Revenue from advertising has become an important stream of income for companies that broadcast various forms of media. For companies that offer free service, such as the major media networks that broadcast over-the-air as well as over cable and internet-based companies that offer free services such as searches, revenue generated by sponsored ads typically constitutes a majority of the revenue.

There are several measurements that go into determining how much to charge a sponsor for placing in advertisement during a program or video or on a webpage, but the primary factor is the "effectiveness" of the ad. Basically, if it can be determined, what is the per dollar revenue increase per dollar spend advertising. The higher the revenue generated per dollar invested, the more "effective" the ad was. Some factors that may contribute to the effectiveness of the ad are the number of viewers that are watching the ad, the types of viewers that are watching the ad, and the ability of the ad to connect with those viewers. Thus, an ad will typically be more expensive when shown during a major sporting event rather than at 3 am in the morning.

Typically, the focus of a marketing campaign will be on the current customer base or a target customer base, and focus less on consumers the company feels unlikely to purchase a product or service. A company will try to tailor the advertisement to best meet the goals, i.e. an advertisement that appeals to youth at a time and on a channel that youth will likely be watching. In broadcast media, the types of advertisements typically were geared around the viewers of the particular show the advertisements would be watching. But this approach has several limitations, such as the fact that consumers of various ages may be watching the show as well as shows on other networks or broadcasters.

There are limitations to this approach. For example, an advertisement may be based upon a study of the average viewer of a television show rather than the habits of the actual viewer. Additionally, the advertisement is typically based upon the television show rather than the habits of the viewer. For example, a person may watch football but not be interested in buying alcohol. The success of the advertisement on that viewer is effectively zero. Although marketing firms that typically handle the advertisement campaign account for that in the budget as a loss, it is still a shortcoming in the budget and the current way of advertising.

Some companies are attempting to make up for this shortcoming by coming up with schema to "target advertise," that is, tailor the advertisement to the individual. Some current ways of advertising include changing the advertisement based upon the viewer's location. Although providing a finer degree of granularity as compared to earlier methods, a large degree of uncertainty remains. Further, although product placement is becoming more prevalent in media, product placement does not meet the need to advertise to the specific viewer and offers little variability with regards to altering the advertisement placement or time to be more appropriate based upon the content of the media the advertisement is shown within are limited.

SUMMARY

Advertisements to be inserted into the media are selected based upon the content of the media. The media may be any type of media, with music and video being two examples. The content may be the story occurring, the type of music being played, the genre of movie, etc. The content of the media may also be analyzed to determine a position within the media in which to insert the advertisement. Thus, in addition to the above, the content may also include scenes within a movie or television show.

The source of the media may vary, including cable and satellite providers as well as websites on the internet. In the example of a website, a website may be used to store uploaded videos and to playback selected videos. The operator of the website may analyze the videos and place various advertisements within the video. For example, the video may be of an individual lip-synching a rock-n-roll song. The website owner may analyze the song and determine suitable advertisements for the video content. The advertisement may be a company logo digitally placed on the t-shirt of the person lip synching the song or a poster of a product digitally inserted on a wall behind the person in the video.

The media may also be digital pictures stored on the internet. For example, a company may analyze digital pictures on the internet and determine suitable advertisements to be digitally inserted into the picture when viewed by a user of the website. In that example, a website that searches and catalogues pictures or images may determine that a particular advertisement is suitable for a particular picture. For example, the advertisement may be an alcoholic beverage and the image may be a sporting event. When the image is returned as a result of a search, when the user views the image, the advertisement may be digitally inserted prior to display to the user.

In another example, the media may also be video or audio that are received from various sources, including a cable company, an online video or music source, a cellular network as well as any other source of video or audio. The video or audio may be analyzed to determine appropriate advertisements to be inserted into the video or audio so that the advertisement may be seen or heard by the viewer or listener of the media.

An exemplary and non-limiting embodiment may include analyzing a media file to determine a content, determining a plurality of advertisements that may be inserted into the media file based upon the content, and storing the plurality of advertisements. Another exemplary and non-limiting embodiment may include downloading a plurality of advertisements, analyzing an unmodified media file to determine a content, determining a plurality of advertisements that may be inserted into the unmodified media file based upon the content, and generating a modified media content by inserting at least one of the plurality of advertisements into the media content.

A still further exemplary and non-limiting embodiment may include a system having a first memory for storing a plurality of advertisements, a second memory for storing a media content file, and a first processor for analyzing a media content file to determine at least one advertisement stored in the first memory to insert into the media content file stored in the second memory. A further exemplary and non-limiting embodiment may include a media playback device having a first memory for storing a plurality of advertisements, a second memory for storing a media file, a first processor for analyzing a media file to determine a content, and a second processor for determining at least one of the plurality of advertisements to insert into the media file based upon the content.

An additional exemplary and non-limiting embodiment may include using either a portion or all of the data received from the analysis of the media according to the present invention and derive a digital imprint of the analysis. Other media may be analyzed in the same manner to derive a digital imprint. If desired, the two imprints may be compared to determine a probability of similarity of content between the two media. For example, a movie studio may run a movie picture through the analyzer of the present invention to derive a digital imprint. The studio may then use a webcrawler service to search popular video internet distribution websites for media files and analyze those media files. If the digital imprints are the same, or similar within a pre-determined range, a possible copyright violation may have occurred.

A still further exemplary and non-limiting embodiment may including using either a portion or all of the data received from the analysis of the media according to the present invention and derive a digital imprint to catch viral content prior to playback on a media playback device. The digital imprint of the media being downloaded is compared to a known, valid imprint of the media. If the digital imprints are not the same or are not similar within a pre-determined range, the media may have been altered or supplemented with additional code, such as a virus. The user of the media playback device will preferably be alerted that malicious or unknown code was found in the media.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. It should be understood that the explanations illustrating data or signal flows are only exemplary. The following description is illustrative and non-limiting to any one aspect.

Exemplary Network Architecture

Figure 1:
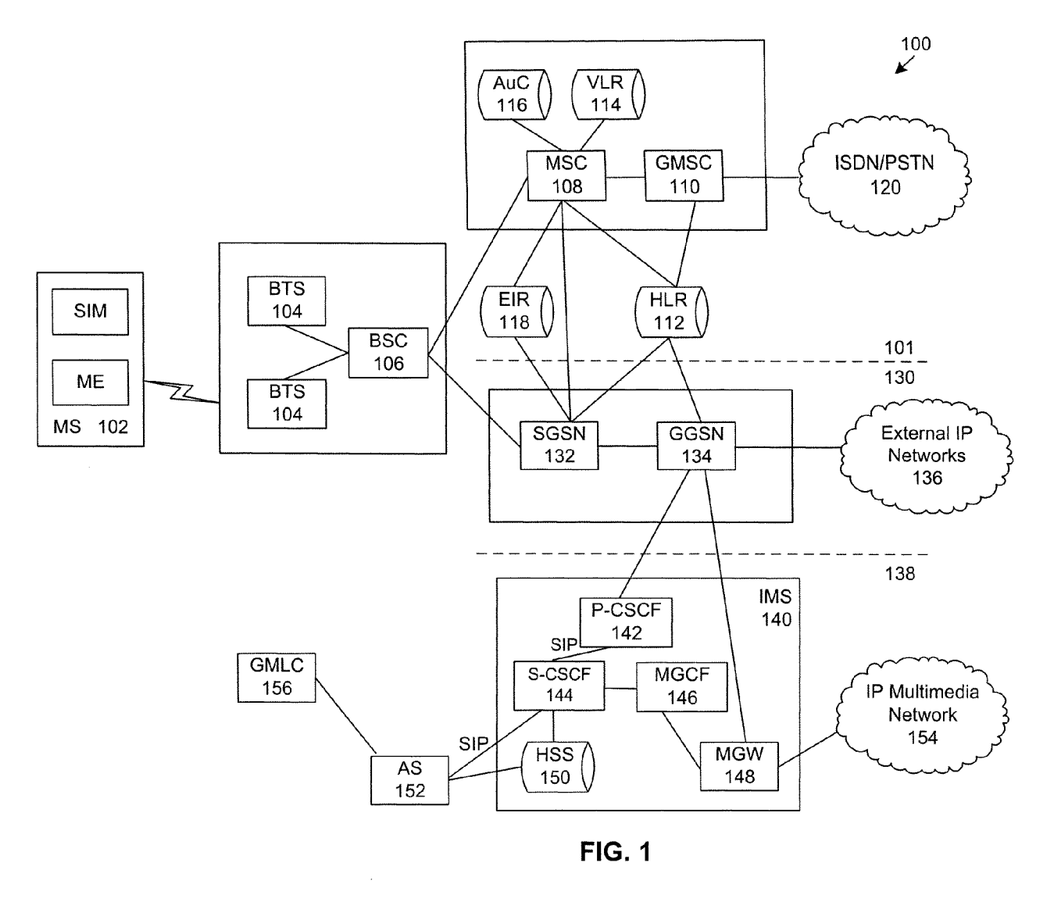
FIG. 1 illustrates an exemplary GSM/GPRS/IP multimedia network architecture.

FIG. 1 shows a GSM/GPRS/IP multimedia network architecture 100 which includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132 and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls. The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Insertion of Advertisement into Media File

Figure 2:
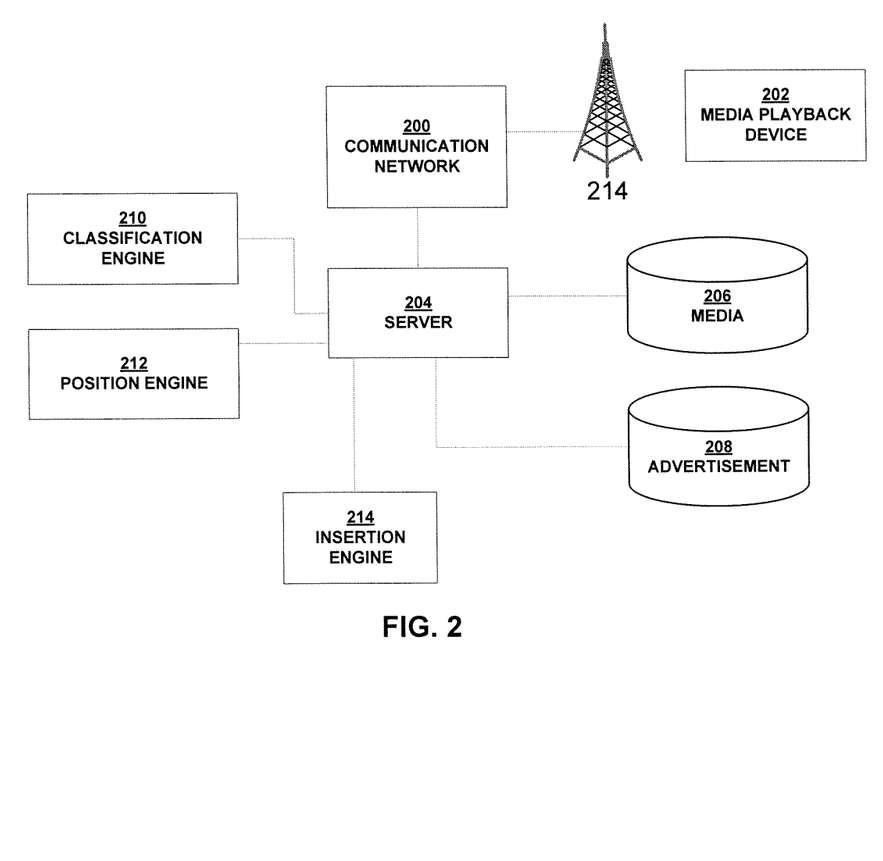
FIG. 2 is an exemplary and non-limiting diagram illustrating a system for modifying a media file to include advertisements.

FIG. 2 is an exemplary and non-limiting example of a system for modifying a media file. The media file is preferably modified to include a preferred advertisement, or multiple advertisements, in various places in the media file. For example, if the media file is a television show, the content may include, among other things, the action occurring within the television show, the type of television show, and times in which the action is relatively calm. In another example, if the media file is a music file, the content may include, among other things, the genre of the music and the periods between the songs.

In one exemplary and non-limiting example, the media file may be modified prior to downloading by a media playback device. The download may occur in various manners, including over a cellular telephone network, a cable network, the internet, or a satellite connection. A media playback device may include, among others, a computer, a personal data assistant, a cellular telephone, a video player, or a music player, such as an MP3 player. The present disclosure is not limited to the above manners of downloading music to a media player, nor on a particular type of media player. Further, the present disclosure is not limited to any particular type of network or system in which media files may be received from.

Shown in FIG. 2 is an exemplary and non-limiting example of a system for modifying a media file to be broadcast or transmitted to a media playback device. Although the components described with regards to the system of FIG. 2 are shown integrated into a single, discrete system, the present disclosure is not limited to that configuration. For example, one or more of the components shown in FIG. 2 may be integrated or operate entirely on another system or apparatus, such as media playback device 202. The system is shown is for illustrative purposes only and is not intended to limit the scope of the present disclosure to such a configuration.

Communication network 200 is in communication with media playback device 202 through antenna 214. Communication network 200 may be various types of networks, including a cellular telephone network. Although not limited to a cellular telephone network, the following description is based upon the implementation in a cellular telephone network. Therefore, media playback device 202 may be a cellular telephone or other device that communicates over a cellular telephone network and is capable of playing a media file.

The system of FIG. 2 further includes media file storage 206 and advertisement storage 208. Media file storage 206 preferably contains either unmodified media files or modified media files. The media file format may vary depending upon the type of file stored. For example, a music media file may be stored as an MP3 file whereas a video file may be stored as an MPEG file. Although not required, the advertisements are preferably the same file format as the media file. For example, it may be preferable to modify a video media file with a video advertisement. As another example, to reduce the file size transmitted over the cellular network, it may be preferable to modify a video file to include an advertisement that is an audio file.

The media files and advertisements are stored in storage 206 and 208 by server 204 in communication with network 200. Server 204 may receive the files to be stored in various manners, but may receive them through communication network 200. Prior to sending a modified media file to network 200 to be transmitted to media playback device 202, server 204 will preferably perform an analysis of the media file prior to modification to determine which advertisements stored in storage 208 may be appropriate and preferable for insertion into the media file. As discussed above, there may be various factors that go into the determination of which advertisements to insert. Continuing with the examples above, an advertisement that is to be inserted into a media file whose content contains graphic violence may preferably not be oriented towards young children. An advertisement that is to be inserted into a media file whose content contains sports programming may preferably not be advertisements for home goods such as a refrigerator.

The criteria established for determining a preferable advertisement to insert may be based on various factors, including demographic and marketing data, and may preferably be determined by the advertiser. For example, a company may only wish to advertise on religious programs. Thus, the company may be charged only when the advertisement is actually inserted into a media file. The advertiser may therefore by able to better focus marketing revenue by taking advantage of the content of the media in which the advertisement will be inserted into. Further, a media content provider, such as a cable company, may be able to better meet the needs of their advertisers by inserting advertisements based upon the content of a particular day or week. For example, a cellular network provider which may distribute videos upon demand may, prior to downloading the video file to the cellular telephone, insert advertisements into the video. An advertiser may pay to have at least three advertisements during a certain time period. The cellular network provider may insert a minimum number of advertisements into downloaded video during that timeframe into media that has been determined to have preferred media content.

To perform an analysis on a media file to be transmitted to device 202, server 204 will initiate classification engine 210 to determine what advertisements may be preferably inserted based upon the content of the media file. Classification engine 210 may use various searching algorithms to classify the content of the media based upon criteria, as in the example criteria listed above. The algorithms may be video content search engines that search for specific scene types, e.g. action scenes or scenes with food. The algorithms may also be audio content search engines that search for a particular type of music. In that example, "techno" music is often associated with high energy activities, such as dancing or working out. An energy drink manufacturer may find it preferable to have their advertisement inserted while techno music is being played. Once classification engine 210 completes the analysis, the server determines what advertisements stored within storage 208 are candidates to be inserted into the media file.

To further narrow the use of the advertisement within the media file, it may be desirable to insert a commercial into a certain portion of the media file. In addition to the examples provided above, a company may want to have their commercial, or advertisement, play during "techno" songs, but play when the song is moving fast or moving slow. Additionally, a company that sells luxury cars may want to insert an advertisement during a television show that appeals to a higher end consumer. The company may further want the advertisement to be inserted after a scene in which a car of the company's brand is shown in the television show.

Thus, the system of FIG. 2 may also have position engine 212. Position engine 212 analyzes the content of a media file and determines an optimal position, or multiple optimal positions, in which to insert the commercial. Position engine 212 may determine that a certain number of positions within the media file are progression points in the action that are natural insertion points. Additionally, position engine 212 may also search the content to determine particular scenes or moments in an audio clip that are particularly well suited for an advertisement position.

Once position engine 212 determines preferable positions within the media file to insert an advertisement, position engine 212 informs server 204 of the positions for later insertion. It may be preferable to have classification engine 210 and position engine 212 to work together to determine not only an acceptable advertisements, but also, an acceptable position within the media file to insert the advertisement. Server 204 uses the information provided by classification engine 210 or position engine 212, or both, and uses insertion engine 214 to insert the advertisement. The modified media file, containing the advertisements, or multiple advertisements, is then stored in storage 206 for eventual transmission to device 202.

Figure 3:
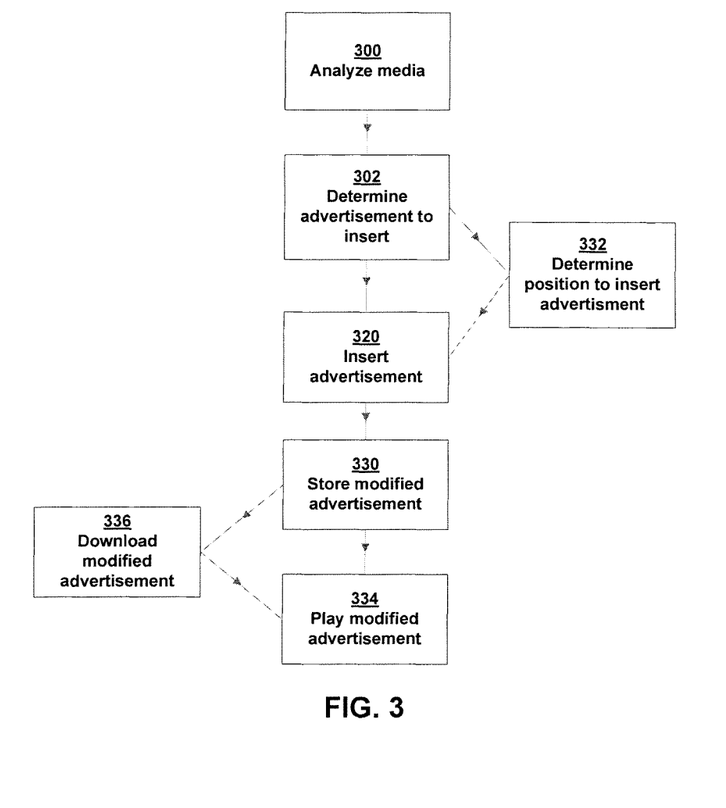
FIG. 3 is an exemplary and non-limiting flow diagram illustrating a way to advertise on a media playback device.

FIG. 3 illustrates an exemplary and non-limiting way to advertise within media files. At step 300, the media file is analyzed. For the purposes of describing FIG. 3, it is assumed that the classification will perform the analysis first at step 300. It should be noted that either the classification engine or the position engine may perform an analysis separately, with the analysis performed first by either, or both the classification engine and the position may perform an analysis, with either engine performing the analysis first or performing the analysis concurrently with the other engine. After the media has been analyzed, at step 302, the classification engine will determine what advertisement or advertisements are preferably inserted into the media.

If the media is to be analyzed by both the position engine and the classification engine, at step 332 the position engine will determine what positions within the media file the advertisements determined by the classification are preferably inserted. At step 320, the insertion engine inserts the advertisements into the media file and the newly modified media files are stored at step 330. If the modified media file is to be downloaded to a media playback device, at step 336, the modified media file is downloaded. If the media playback device is performing the steps of FIG. 3, step 336 is not applicable. Finally, once the modified media is ready for playing, at step 334 the modified media file may be played on the media playback device.

Figure 4:
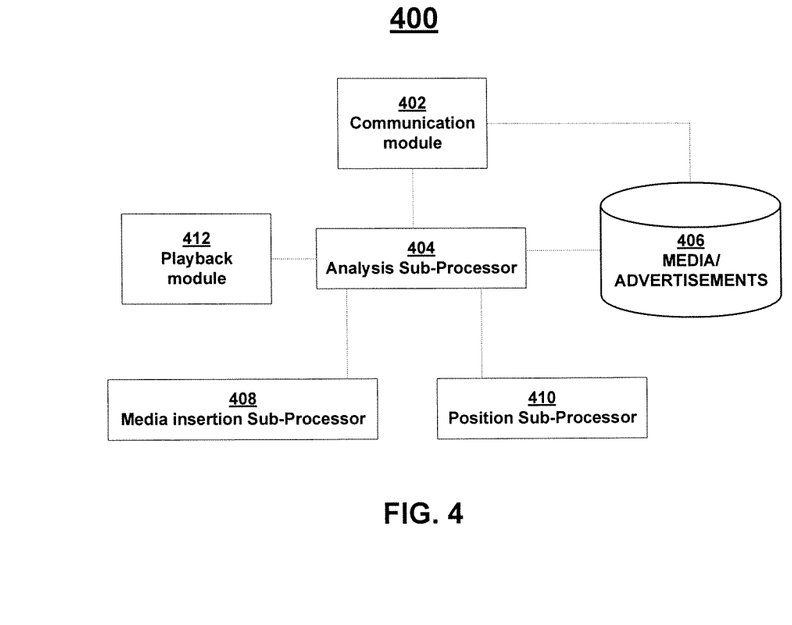
FIG. 4 is an exemplary and non-limiting media playback device.

The media playback device may take various forms, including, but not limited to, a cellular telephone, a personal data assistance, an MP3 player, a video player, a personal computer, a cable television box, a television, etc. The present disclosure is not limited to any particular type of media playback device as long as the device is used to playback media files. FIG. 4 illustrates an exemplary and non-limiting example of an apparatus for generating modified media files. The apparatus may include devices such as a handheld media player, a cellular telephone, or a cable or satellite set-top box. The modules or components of the apparatus of FIG. 4 may be contained within one, single device or may constitute components operating in several devices.

Apparatus 400 has communication module 402 which preferably receives or sends information such as media files. For the purposes of FIG. 4, the media file received via communication module 402 is an unmodified media file. Communication module 402 receives the media file and stores the media file in storage 406. Communication module 402 may also receive advertisements either in conjunction with or separate to the receipt of the media file. It may be preferable to pre-determine times in which advertisements are received at communication module 402. For example, because of the potential bandwidth used in a cellular telephone network, it may be preferable to download advertisements at a time of day when the cellular telephone is likely to not be in, such as 2 am, or download advertisements when it is determined that the cellular telephone is actually not being used.

If it is desired that a media file is to be played using playback module 412, analysis sub-processor 404 accesses the media file from storage 406 and determines what advertisements stored in storage 406 may preferably be inserted into the media. If further analysis is desired, analysis sub-processor 404 may send the media file to position sub-processor 410 to determine positions within the media file that the advertisements may preferably be inserted. Once the analysis is complete, the media file and the advertisement or advertisements are sent to media insertion sub-processor 408. Media insertion sub-processor 408 inserts the advertisements according to the analysis of position sub-processor 410 and/or analysis sub-processor 404. After insertion, the modified media file may be stored in storage 406 or played using playback module 412.

Digital Imprint

Digital media use on discrete or disparate devices, such as cellular telephones, introduces additional issues. Cellular telephones, as well as other computing devices in communication with the internet, are increasingly able to download and play media files from the Internet. Devices such as cellular telephones and the like preferably allow the user to have access to media files in a variety of locations. In the case of the cellular telephone, the access is almost unlimited, as the media file may be downloaded through the cellular network connection.

Making media files readily available to a user with an internet connection creates additional issues. It is well known that copyright violations occur regularly on the Internet. Because of the possibility to interact anonymously, users can upload and download copyrighted content with a relatively small possibility of being discovered. A cellular telephone having a connection to the internet creates an additional problem. Typically, in the case of a landline connection to the internet, such as one through a telephone company's ISP, the IP address of a computer accessing or uploading copyrighted media may be discovered. During an investigation, a company owning the rights to the accessed copyright work may be able to determine the IP address, and thus the physical address, of the copyright violator. Although it may be possible to hide a computer's IP address, such as through the use of an anonymous proxy server, these systems are typically unreliable and/or cost money to use.

In the case of a cellular telephone, which accesses the internet through a cellular network rather than an ISP, the ability to monitor for copyright violations may be even more difficult. First, the ability to find IP addresses through a cellular network is not as well developed as through a standard ISP, i.e. a cellular telephone may not show up when a discovered IP address is "pinged" because the routing is through the data handlers of the cellular network. Second, cellular telephones may not be associated with known accounts. For example, a pre-paid cellular telephone may have the ability to download and store media from the cellular network. If the cellular company that supports the prepaid cellular telephone requires some form of identification, a user wishing to use the cellular telephone for improper purposes may provide fake information.

An additional issue that may occur when using a cellular telephone to access media available on the Internet is the receipt of unusable media or media having malicious code. Because of the relative limited bandwidth and speeds available for downloading media over a cellular network connection, performance is a primary concern. The faster the media is downloaded, the quicker the used bandwidth is opened for other communications or other media downloads. But the need for performance may not provide the user of the cellular telephone the protection often afforded through a home or office computer connected through an ISP. For example, a home or office computer typically has virus protection software in place to detect malicious code, either when received or during playback. Because of the limited computing power available on a typical cellular telephone, virus protection software is limited, if available at all, despite the fact that the line distinguishing a cellular telephone from a personal computer is increasingly vanishing.

Further, because the bandwidth available for downloading media from the Internet in a cellular network is typically limited, downloading faulty media files becomes a costly expense, both for the user and the cellular network provider. For example, if a user wishes to download a video of a television show that recently aired, the user may access a website to obtain the video. After downloading the video and commencing playback, the user may realize that the video is corrupted, i.e. unplayable, or not the content expected. By the time of playback, though, either a significant portion or all of the media have been downloaded to the cellular phone.

To protect a copyrighted media file, companies typically search for descriptions attached to the media that may indicate the media is a copyrighted work. This is because searchers looking for copyrighted works typically use search terms that are the same as or closely related to the original name of the copyrighted work in order to search for the media file over the Internet. If a media file located on the internet has no searchable description or is mislabeled, the discovery of the copyrighted media file by a company or individual owning the rights to the media file contents may be difficult to impossible.

Further, some media may not normally have descriptions attached to the media file. When individuals take digital pictures, the camera assigns a description to the picture file based upon a pre-determined filing system. If the user does not change the name of the file, the contents of the file may not be discovered using typical search engines. For example, if a person was using a picture taken of a building that may be copyright protected, unless the file name was changed to include terms that relate to the building, the discovery of the improper use may not be discovered.

Figure 5:
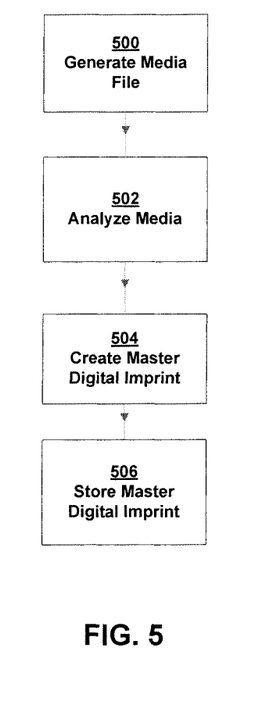
FIG. 5 is an exemplary and non-limiting flow diagram illustrating a way to create a master digital imprint.

In order to search for copyrighted media, a searchable piece of information must be extracted from media files. Because media files may not be labeled properly, if at all, searching using typical text searching engines may not return results that are inclusive. The searchable piece of information is preferably quickly extracted from the media file and is small enough in size to allow a system to perform a rapid comparison. FIG. 5 is illustrative of a process to derive a digital imprint from a media file for searching and/or comparisons purposes. For the purpose of the following description, a video file may be used as the media file, though it should be understood and appreciated that the present disclosure may work for other media types as well, including sound.

At step 500, a media file is generated. In the example of a video file, which typically includes both video and sound data, a video recorder records the video and sound onto a recording device such as a digital tape or directly into the memory of a computer. The video is modified through various processes into one of several types of video file formats to create a playable digital media file. At step 502, the created digital media file is analyzed to create a master digital imprint at step 504.

The digital imprint may be created several ways, including, for example, through the use of position engine 212 of FIG. 2, above. An analyzer will preferably generate at least one identifier associated with the content of the media. For example, an identifier created by an analysis using position engine 212 may be a time slot in which it may be acceptable to insert an advertisement. In another example, if the identifier is created using a characterization engine, the identifier may be an outputted characterization of the portion or portions of the media analyzed for the insertion of an advertisement.

As discussed, a video may be analyzed using a position engine, with the output being timeslots of the video that an advertisement may be inserted. Position engine 212 analyzes the content of a media file and determines an optimal position, or multiple optimal positions, in which to insert the commercial. For a given length of video, the probability that position engine 212 will output the same timeslots for two different videos is low.

As the length of video sampled increases, the probability decreases. Thus, the positions for insert may be used as the digital imprint. For example, if a video is of a file size that is two minutes worth of playback time, the insertion engine may have determined that timeslots, in seconds, 10, 24, 39, 100, 110 are appropriate places to insert a commercial. The timeslots can then be used as a digital imprint, as the timeslots would be dependant upon the content of the video. After the digital imprint is created, the imprint is stored to be used as a checking imprint against other video files that have been analyzed. For example, the digital imprint stored may be compared against a digital imprint of a file retrieved from the web. In this example, a company may create a program that crawls the internet searching for video files. The video files found may be analyzed to create a digital imprint and checked against the stored digital imprints to determine if the video file contains copyrighted material. Copyrighted materials may include original works of art such as, but not limited to, text, picture, sound, and images captured as video. The present subject matter is not limited to any particular type of original work of art as defined by copyright law.

Another method in which a digital imprint may be created is through the use of a geometric overlay onto a picture, and using the geometric overlay as the digital imprint. In a simple example, a picture of a downtown street grid has been taken. The street grid is analyzed for certain geometric markers, such as straight lines. An analyzer would create a geometric overly of the straight lines of the downtown grid and create a separate picture file of the geometric overlay. The overlay is the digital imprint of the picture. The analyzer can analyze a picture for other features, such as curves or known objects.

At the time of creation, the analyzer will be configured to create a geometric overlay depending upon the imprint desired. The geometric overlay can then be used to find copy written material. For example, a picture of a building, both which may be protected under copyright laws, is analyzed to determine a digital imprint, i.e. the geometric overlay. A program is used to crawl the web and retrieve pictures. The retrieved pictures are analyzed to create a digital imprint, which is then compared to the original digital imprint. If the two are similar, the retrieved picture may be copyrighted material.

Additionally, the digital imprint may also be used as a checking mechanism to reduce the likelihood of receiving a corrupted or improperly labeled file. For example, a user may prompt a system to send a video file to the user's cellular phone. The user found the file on a file sharing website. Prior to sending the file, the provider may analyze the video to determine a digital imprint. The digital imprint may then be checked against the master digital imprint created in step 504. If the imprints are not the same, or within a set range, the user may be notified that the file may be corrupted, contain malicious code, or may be mislabeled.

Figure 6:
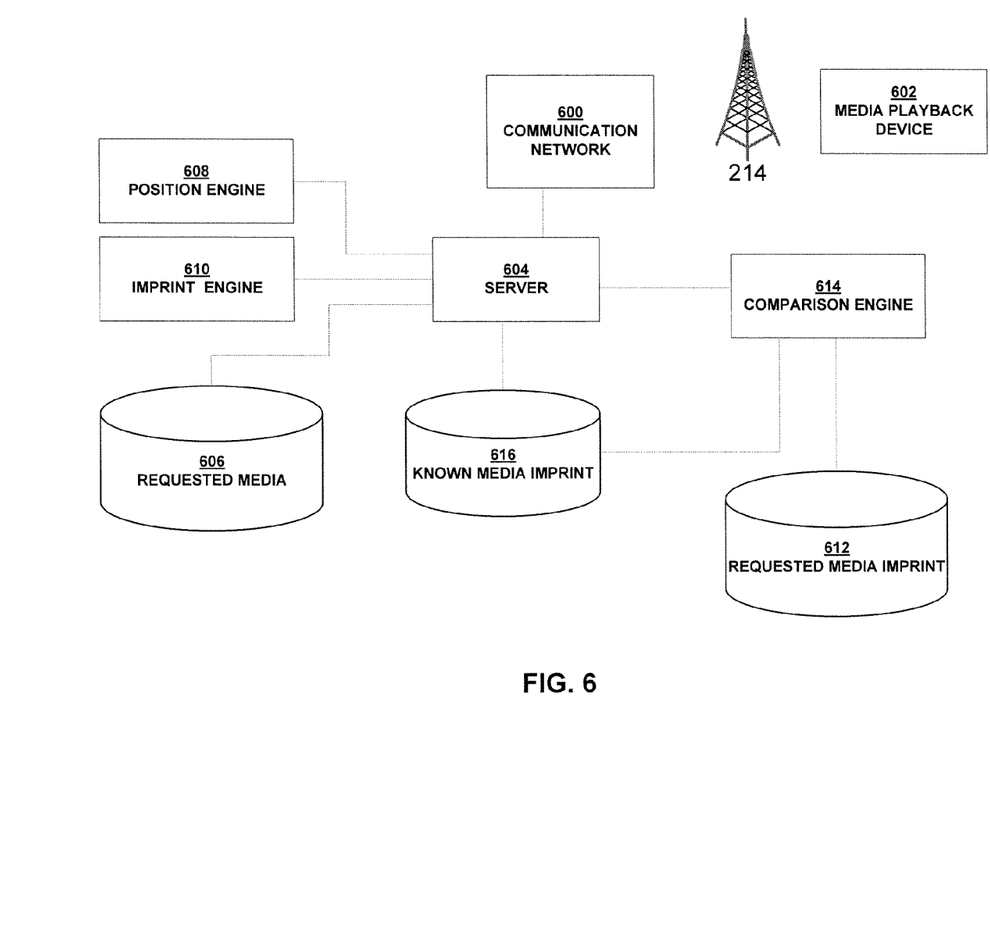
FIG. 6 is an exemplary and non-limiting flow diagram of illustrating a system to compare media content.

FIG. 6 is a system for creating and checking digital imprints of video files. Communication network 600, such as a cellular network, is in communication with media playback device 602. A user has prompted network 600 to transmit a video file to device 602. Network 602 contacts server 604 and requests the video file. Server 604 retrieves the video file from requested media storage 606. Server 504 then sends the video file to position engine 608, which analyzes the video file and determines timeslots for advertising. As discussed above, there may be several ways to analyze a video file to determine a digital imprint. After position engine 608 determines the timeslots, the information is sent to imprint engine 610 which combines the timeslots and creates a digital imprint file to be stored in requested media imprint storage 612.

After the digital imprint file for the requested media is created, server 604 retrieves the known media imprint from media imprint storage 616. The known media imprint may be an imprint created by the company that created the original work of art, such as a television or movie studio, or a third party that has analyzed an authentic portion, or all, of the video file. Once the known media imprint is retrieved, server 604 invokes comparison engine 514 which compares the requested media imprint with the known media imprint.

The similarity of the requested media imprint to the known media imprint is determined. The output of the determination is a similarity level, i.e. a relative closeness of the two. For example, if the two imprint are identical, the similarity may be 100, or 100% of the imprints match to each other. If the two imprints share a significant number of identifiers, such as insertion points, the similarity may be 80, or the two imprints have 80% commonality. If the two imprints are completely different, i.e. no common identifiers, the similarity may be 0. To increase the efficiency of the process by increasing the number of potentially similar imprints while decreasing the number of false hits, a range of similarity levels may be established. For example, the range may be from 70-100. Thus, any digital imprint comparisons with similarities from 70% to 100% may be identified as a potential copyright violation. A comparison with a similarity level falling below 70% may pass as similar in nature but not a potential candidate for a copyright violation.

To perform a valid comparison, the two imprints may need to be aligned or matched up. For example, a video file may have metadata inserted that indicates the timing position of the video. The two imprints should be aligned so that the imprints are of the same portion of the video. Once the imprints are compared, if they are within standards, e.g. are not within the range described above, the video file may be transmitted to media playback device 602.

Figure 7:
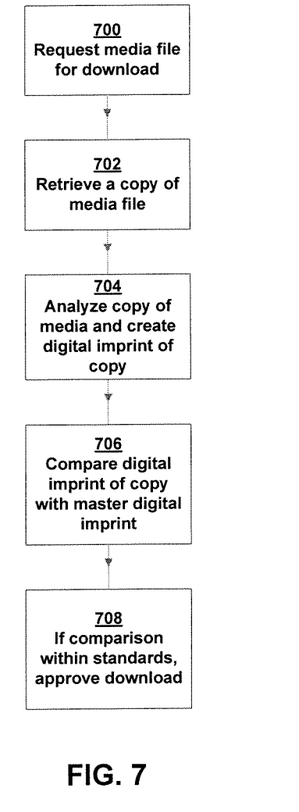
FIG. 7 is an exemplary and non-limiting process for finding viral content in a media file during media download to a media playback device.

FIG. 7 is illustrative of a way that the system of FIG. 6 may use to determine the validity of the file to be downloaded. At step 700, a user requests a media file to be downloaded. The system will retrieve a copy of the media file at 702. The system will analyze the media file and create a digital imprint at step 704. The created digital imprint is compared with the master digital imprint at step 706. If the comparison is within standards, the media file is downloaded to the user at step 708.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device, and at least one output device. One or more programs are preferably implemented in a high-level procedural or object-oriented programming language to communicate with a computer system. However, the program(s) can be implemented in assembly or machine language, if desired. In any case, the language may be a compiled or interpreted language and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder, or the like, the machine becomes an apparatus for practicing the present disclosure. When implemented on a general-purpose processor, the program code combines with the processor to provide a unique apparatus that operates to perform the processing of the disclosed embodiments.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A method for downloading a media file, the method comprising:
    retrieving a media file responsive to a request for the media, wherein the media file is a copy of at least a portion of a master media file;
    creating a copy digital imprint of the media file, wherein the copy digital imprint comprises an indication of positions within the media file to insert at least one of a plurality of advertisements based upon content of the media file;
    comparing, via a processor, the copy digital imprint with a master digital imprint, wherein the master digital imprint comprises an indication of positions within the master media file to insert at least one of a plurality of advertisements based upon content of the master media file;
    determining, via the processor, a level of similarity between the indication of positions to insert at least one of a plurality of advertisements within the copy digital imprint and the indication of positions to insert at least one of a plurality of advertisements within the master digital imprint; and
    approving the transmission of the media file when the determined level of similarity is within a pre-determined range of levels of similarity.

2. The method of claim 1, wherein the media file comprises an audio media file, a video media file, an image media file, or a multimedia file.

3. The method of claim 1, wherein the master digital imprint and the copy digital imprint are created by classifying the content of the media file.

4. The method of claim 1, wherein the master digital imprint comprises a geometric overlay and the copy digital imprint comprises a geometric overlay.

5. The method of claim 1, wherein the level of similarity between the copy digital imprint and the master digital imprint is based on insertion points at which to place advertisements in the copy media file and the master media file.

* * * * *